(12) United States Patent
Rogers

(10) Patent No.: US 6,325,105 B1
(45) Date of Patent: Dec. 4, 2001

(54) SURGE SUPPRESSION APPARATUS INCORPORATING A PRESSURE REGULATION ASSEMBLY

(75) Inventor: John Anthony Rogers, Broadstone (GB)

(73) Assignee: Lombard Pressings Limited, Swansea (GB)

( * ) Notice: Subject to any disclaimer, the term of this patent is extended or adjusted under 35 U.S.C. 154(b) by 0 days.

(21) Appl. No.: 09/643,855

(22) Filed: Aug. 23, 2000

(30) Foreign Application Priority Data

Aug. 27, 1999 (GB) .................................................. 9920213

(51) Int. Cl.[7] .................................................. F16L 55/04
(52) U.S. Cl. ................................................ 138/30; 138/31
(58) Field of Search ....................... 138/30, 31; 137/568; 220/720, 721; 417/395, 540, 543

(56) References Cited

U.S. PATENT DOCUMENTS 3,741,692  6/1973  Rupp .................................. 138/31 X
4,556,087  12/1985  Casilli .................................... 138/30
5,337,791  *  8/1994  Plager et al. ............................ 138/30

FOREIGN PATENT DOCUMENTS 40 31 239   4/1992  (DE) .
0 707 173   4/1996  (EP) .

* cited by examiner

Primary Examiner—Patrick Brinson
(74) Attorney, Agent, or Firm—Lowe Hauptman Gilman & Berner, LLP

(57) ABSTRACT

A surge suppression apparatus including a chamber divided into first and second sub-chambers by a diaphragm, a diaphragm follower maintained in contact with the diaphragm and, in use, following the movement of the diaphragm in response to a pressure differential between the first and second sub-chambers, the position of the diaphragm follower relative to the chamber wall determining the existence or otherwise of a communication pathway between the second sub-chamber and a gas inlet and the second sub-chamber and a gas outlet.

7 Claims, 5 Drawing Sheets

SURGE SUPPRESSION APPARATUS INCORPORATING A PRESSURE REGULATION ASSEMBLY

TECHNICAL FIELD

This invention relates to a surge suppression apparatus incorporating a pressure regulation assembly. More particularly, but not exclusively, the invention relates to a surge suppression apparatus having means for regulating the pressure of a pressurised gas therein.

BACKGROUND FIELD

It is known to use a reciprocating pump for the pumping of a liquid in a delivery system. Such reciprocating pumps do not have a smooth output and a pressure drop occurs in the liquid during the reversal of the pump stroke. Surge suppression. apparatus is used to negate the drop in pressure and thereby improve the constancy of the liquid output pressure.

A known surge suppression apparatus comprises a passive surge bottle which is basically a captive (static) gas volume acting as a pressure reservoir. A passive surge bottle inevitably loses pressure in use and thus there is a necessity for the periodic recharging of the bottle with compressed gas and the subsequent, associated recalibration of the system utilising the bottle. European Patent Application No. EP 0 707 173 A1 discloses a surge suppression apparatus incorporating an active pressure regulation arrangement which recharges the gas pressure therein automatically. Such an active pressure regulation arrangement in a surge suppressor removes the necessity for the periodic recharging of a passive surge bottle, but the apparatus disclosed in EP 0 707 173 A1 tends to be bulky and inconvenient in use. It is an object of the present invention to provide a surge suppression apparatus in an improved and simplified form.

BRIEF SUMMARY OF THE INVENTION

According to the present invention there is provided a surge suppression apparatus including a chamber divided into first and second sub-chambers by a diaphragm, a diaphragm follower in use following the movement of the diaphragm in response to a pressure differential between the first and second sub-chambers, the diaphragm follower being movable relative to the chamber wall and being the movable element of a first valve for determining the existence or otherwise of a communication pathway between the second sub-chamber and a gas inlet and being the movable element of a second valve for determining the existence or otherwise of a communication pathway between the second sub-chamber and a gas outlet.

The diaphragm follower is biased to contact the diaphragm at all times by a loading derived from gas pressure in the second sub-chamber.

Conveniently as an alternative or in addition, the diaphragm follower is coupled to the diaphragm.

Desirably said second valve includes a bleed path which opens prior to full opening of the second valve so as to effect a controlled release of pressure through said gas outlet.

Conveniently said chamber wall is part of a housing assembly which defines static parts of said first and second valves.

Preferably said first and second valves are so arranged that there is a range of movement of the diaphragm on opposite side of a central equilibrium position in which neither valve is operated so as to define a "dead band" in the operation of the apparatus.

Conveniently said diaphragm follower includes a disc of larger diameter than the shaft and smaller diameter than the diaphragm engaging the diaphragm and controlling flexure thereof.

BRIEF DESCRIPTION OF THE DRAWINGS

The invention will now be described, by way of example only, with reference to the accompanying drawings in which.

DESCRIPTION OF THE PREFERRED EMBODIMENTS

Figure 1:
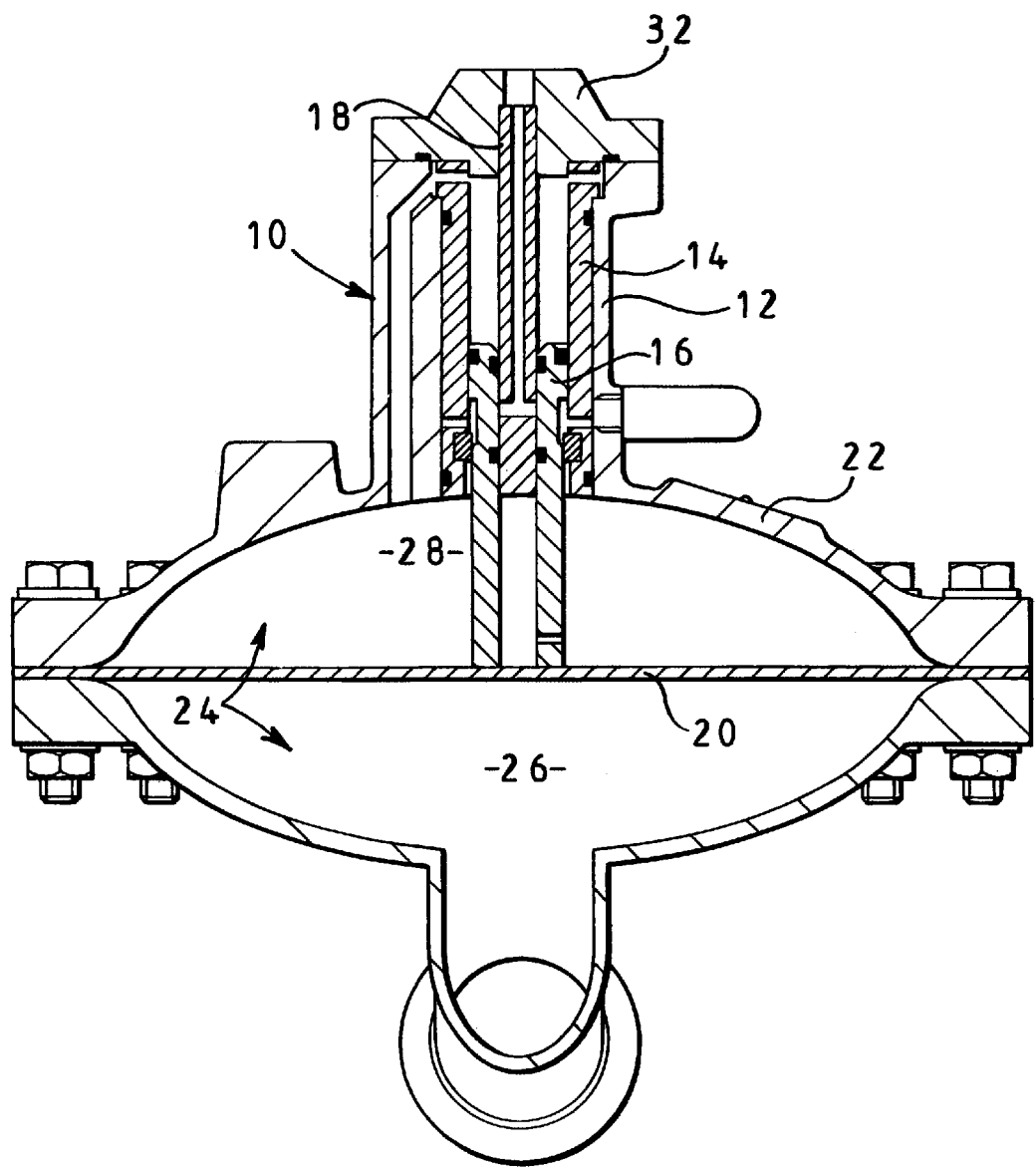
FIG. 1 a sectional view of a surge suppressor incorporating a pressure regulation apparatus according to the present invention.

A surge suppression apparatus 10 includes a circular housing 12, a circular cylindrical sleeve 14, a follower shaft 16, in the form of a sleeve, a centre feed shaft 18 and a flexible diaphragm 20.

In the embodiment shown in the Figures the housing 12 is an integral part of a surge suppressor body 22 and the diaphragm 20 divides a chamber 24 thereof into first and second sub-chambers 26, 28.

The housing 12 comprises a substantially cylindrical hollow body part 30 and a substantially annular cap 32.

A wall 34 of the body part 30 is of differing thickness about its circumference such that the longitudinal axis of a cavity 36, defined by the wall 34, is not coincident with the longitudinal axis of the body part 30. The internal surface of the wall 34 has an outwardly extending ledge 38 at the upper end thereof. A passageway 40 extends through the thickest part of the wall 34 from the second sub-chamber 28, communicating with the cavity 36 above the ledge 38. A passageway 41 extends through the narrowest part of the wall 34 near to the surge suppressor body 22. A top surface 44 of the body part 30 engages an annular base 46 of the cap 32, a ring seal 52 being seated therebetween.

A small chamfered annular projection 54 depends from the base 46 of the cap 32 and the cap 32 has a central longitudinal bore 49 therethrough, the bore 49 having a step 56 therein, the lower portion of the bore 49 being wider than the upper portion thereof.

The cylindrical sleeve 14 has an outer surface 58 and an inner surface 60. A lip 62 projects radially from the outer surface 58 at a level near the upper endt of the sleeve 14. A series of passageways 63 extend radially between the inner and outer surfaces 60, 58 of the sleeve 14 above the level of the lip 62. The outer surface 58 has a first circumferentially extending groove 64 which is slightly below the level of the lip 62 and accommodates a first annular ring seal 66 and a second circumferentially extending groove 68 near to the bottom of the sleeve which accommodates a second annular ring seal 70. An axial elongate gallery 72 is formed on the outer surface 58 extending substantially between the first and second grooves 64, 68. A plurality of circumferentially spaced passages 74 extend radially through the sleeve 14 from near the base of the gallery 72. A third circumferentially extending groove 76 is formed in the inner surface 60 of the sleeve 14 at a level between the passages 74 and the second groove 68 so as to accommodate a first radial lip seal 78.

The follower shaft 16 has a head portion 80 and a body portion 82, the body portion 82 having a smaller diameter than the head portion 80. The head portion 80 has a first circumferentially extending groove 86 in the outer surface thereof provided so as to accommodate a second radial lip seal 88. A second circumferentially extending groove 90 in the inner surface of the follower shaft 16, slightly below the first groove 86, accommodates a third radial lip seal 92. Immediately below the head portion 80 there is a shallow annular recess 94 in the body portion 80. A third circumferentially extending groove 96 is formed in the inner surface of the follower shaft 16 immediately below the recess 94 to accommodate a fourth radial lip seal 98. A radially extending bore 100 is provided towards the lower end of the body portion 82.

The centre feed shaft 18 has an circumferential groove 102 near the lower end thereof, a cross-drilling 104 which communicates with said groove 102 and a central longitudinal bore 106 extending from the top of the centre feed shaft 18, intersecting the drilling 104.

In use, the cylindrical sleeve 14 is fixed inside the housing 12 coaxial therewith, the underside of the lip 62 engaging the upper surface of the ledge 38. The centre feed shaft 18 is fixed in the cap 32 such that the upper end of the centre feed shaft 18 abuts the step 56 and the bore 49 and the drilling 104 are coaxial. The lower end of the centre feed shaft 18 is aligned with the lower end of the sleeve 14 by the step 54 locating on the inner surface 60.

The follower shaft 16 is slidably received by the inner wall 60 of the sleeve 14 and in turn slidably receives the centre feed shaft 18. The lower end of the follower shaft 16 rests on the diaphragm 20 such that shaft 16 moves with the diaphragm relative to the sleeve 14 and the feed shaft 18, in response to flexure of the diaphragm 20.

The passageway 40 and the passageways 63 provide communication between the second sub-chamber 28 and a chamber 108 defined between the head portion 80 of the follower shaft 16 and the projection 54 so as to maintain an equal pressure therein. As the pressures in the second sub-chamber 28 and the chamber 108 are equal the vertical forces exerted on the head portion 80 and body portion 82 of the follower shaft 16 are determined by their effective areas. As the head portion 80 has a larger diameter than the body portion 82 the head portion 80 presents a larger effective area than the body portion 82. Thus there is a net downward force exerted upon the follower shaft 16 maintaining it in contact with the diaphragm 20.

In use, compressed air is supplied to the centre feed shaft 18 via the longitudinal bore 49 through the cap 32 at a pressure in excess of the pressure of the liquid medium present in the sub-chamber 26 in use.

Figure 2:
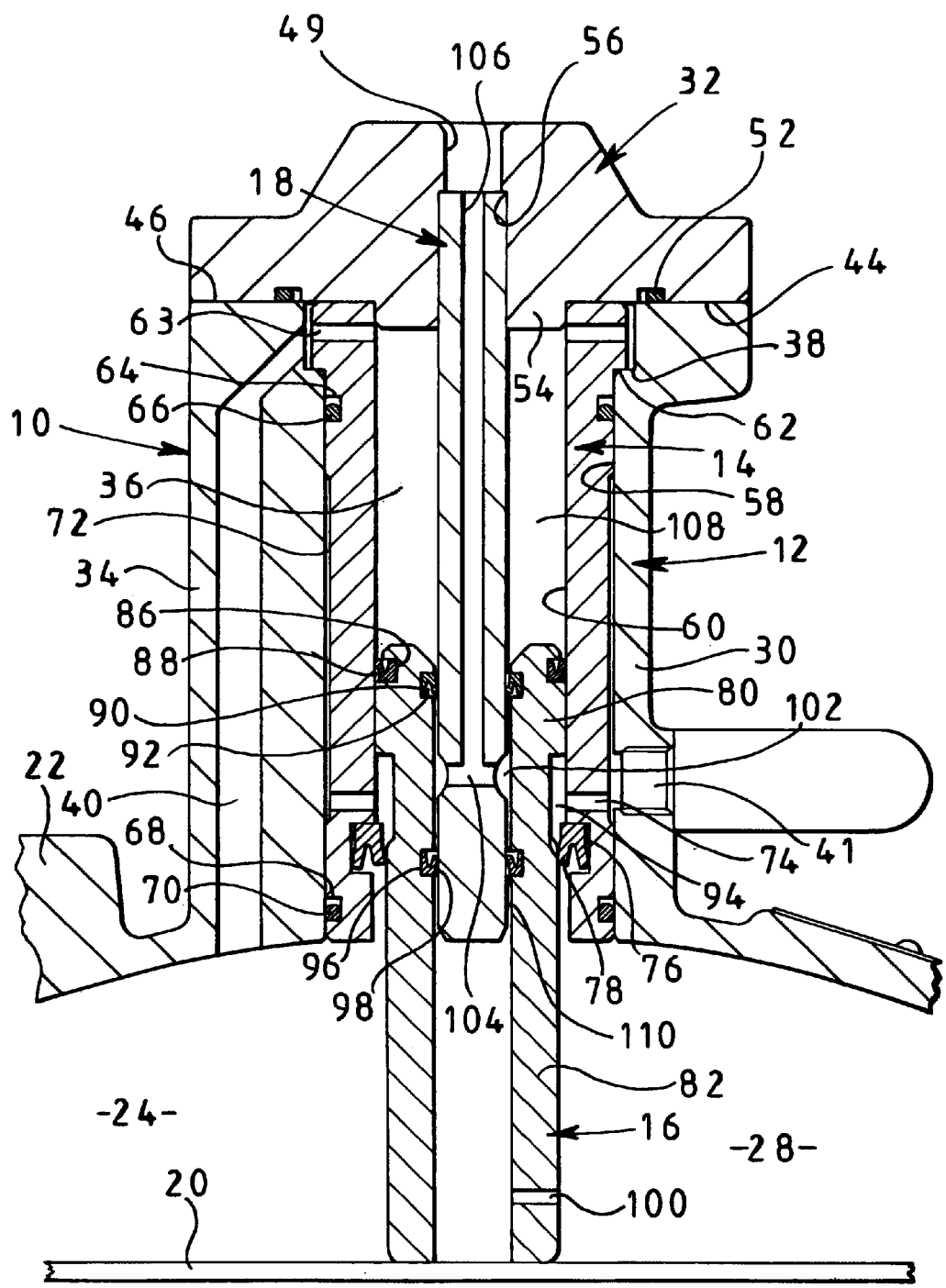
FIG. 2 is a sectional view of a surge suppression apparatus according to the present invention in an equilibrium configuration.

FIG. 2, shows the surge suppression apparatus 10 in an equilibrium configuration, the pressure in the first sub-chamber 26 being approximately equal to that in the second sub-chamber 28. In this configuration the first radial lip seal 78 is in engagement with the follower shaft 16 below the annular recess 94, the second radial lip seal 88 correspondingly engages the sleeve 14 above the recess 94, thereby preventing the venting of air from the second sub-chamber 28 to atmosphere via the passageway 41. The third and fourth radial lip seals 92, 98 respectively engage the centre feed shaft 18 above and below the recess 102 (and cross drilling 104), thereby preventing the ingress of the compressed air into the second sub-chamber 28.

Figure 3:
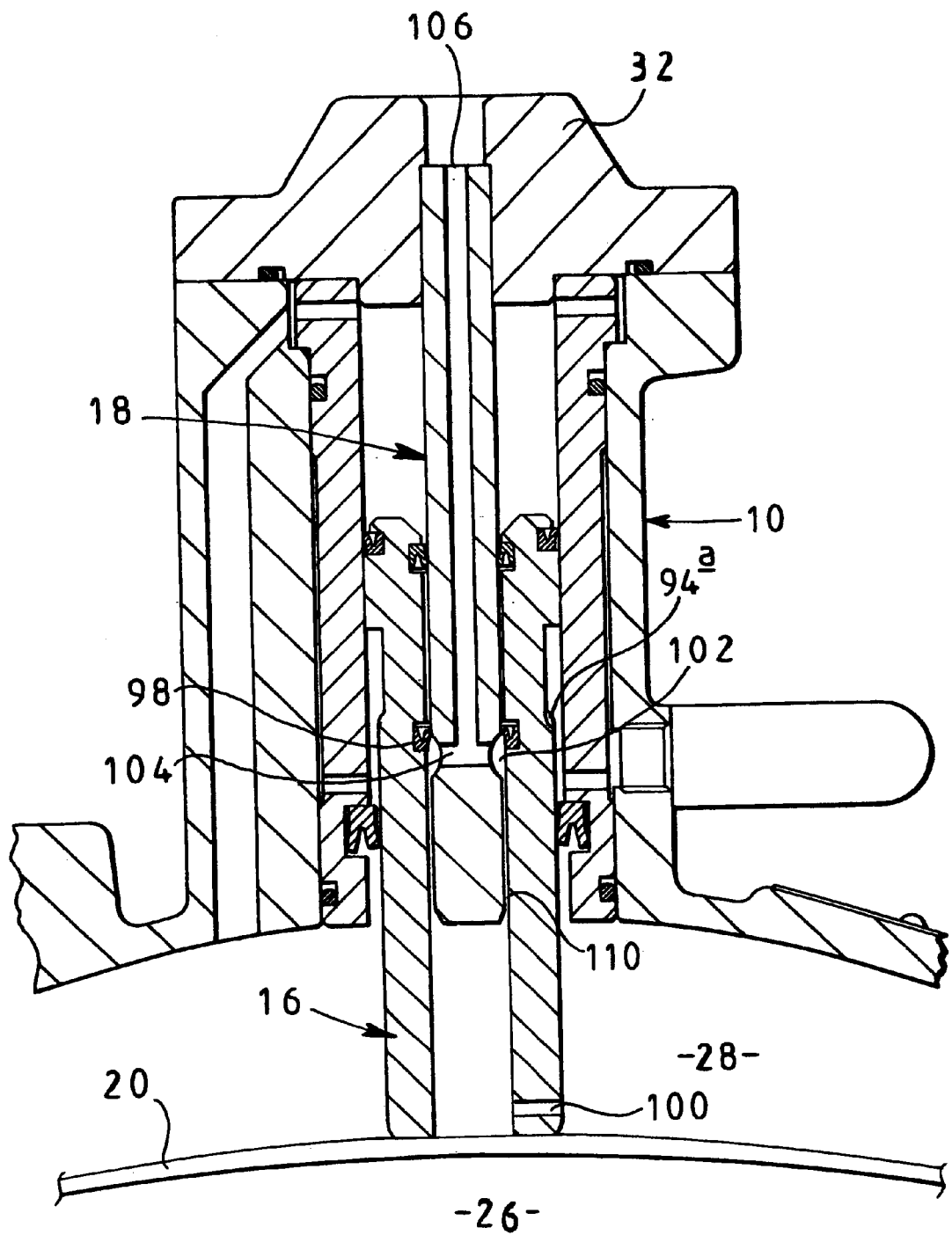
FIG. 3 and FIG. 4 are sectional views of the apparatus of FIG. 2 in alternative non-equilibrium configurations.

FIG. 3, shows the surge suppression apparatus 10 in a configuration corresponding to a greater pressure in the first sub-chamber 26 than in the second sub-chamber 28. In this configuration the follower shaft 16 is displaced upwards by the flexure of the diaphragm 20, causing the fourth radial lip seal 98 to move above the level of the annular groove 102. Compressed air supplied at the cap 32 can flow through the bore 106, the drilling 104, a clearance 110 defined between the follower shaft 16 and the centre feed shaft 18, into the second sub-chamber 28 through the bore 100 thereby increasing the pressure in the second sub-chamber 28.

As the pressure in the second sub-chamber 28 increases the pressure difference between the first and second sub-chambers 26, 28 is reduced thus restoring the equilibrium condition, the diaphragm 20 flexing downwardly. The follower shaft 16 follows this flexure, causing the fourth radial lip seal 98 to return to a position below the annular groove 102, thereby preventing further ingress of air into the second sub-chamber 28.

Figure 4:
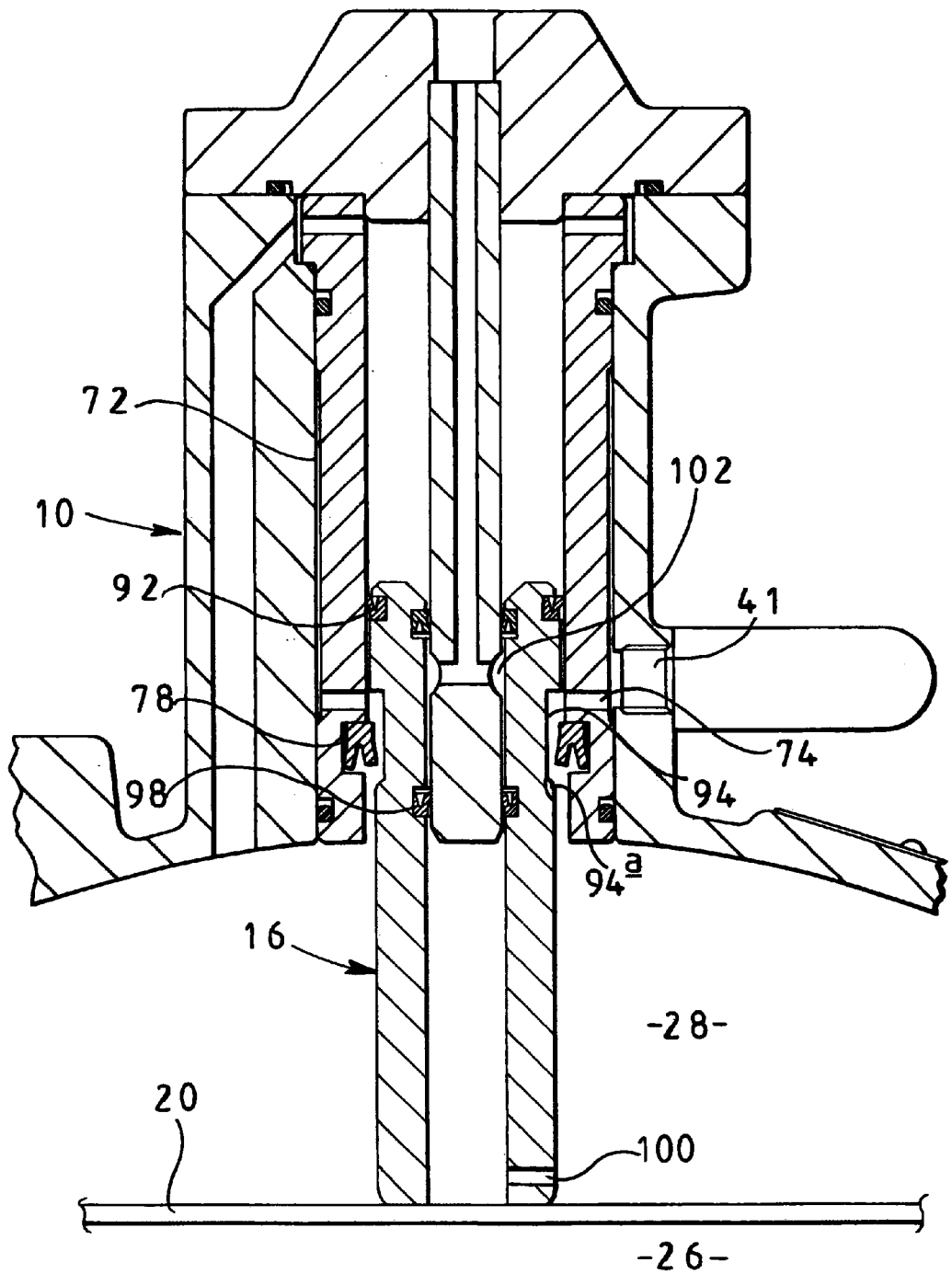

FIG. 4, shows the surge suppression apparatus 10 in a configuration in which there is a lesser pressure in the first sub-chamber 26 than in the second sub-chamber 28. In this configuration the follower shaft 16 follows the downward flexure of the diaphragm 20.

The downward displacement of the follower shaft 16 results in the lower end of the recess 94 passing below the level of the first radial lip seal 78. The second chamber 28 and the passageway 41 are placed in communication with each other via the passages 74 and the gallery 72 allowing excess gas to be vented to atmosphere via the passageway 41. In order to provide a low volume bleed to the exhaust passageway 41 immediately prior to recess 94 passing the seal 78 the shoulder of the recess at the end of the recess closest to the diaphragm, is provided with one or more narrow V-section grooves 94a which, when aligned with the seal 78, allow a bleed of pressure past the seal to the passage 74. The groove 102 is bounded above and below by the third and fourth radial lip seals 92, 98 respectively thus preventing the ingress of compressed gas into the second sub-chamber 28.

As the pressure in the second sub-chamber 28 decreases the pressure difference between the first and second sub-chambers 26, 28 is reduced restoring the equilibrium condition, the diaphragm 20 flexing upwardly. The follower shaft 16 follows this flexure, causing the first radial lip seal 78 to return to a position below the recess 94, thereby preventing communication between the second sub-chamber 28 and the passageway 41 and further venting of air from the second sub-chamber 28. Once the pressures in sub-chambers 26 and 28 are in equilibrium (the FIG. 2 condition), small flexures of the diaphragm are accommodated without adding or exhausting compressed air to or from the sub-chamber 28 by providing a small range of movement of the shaft 16 (referred to as the "dead band") in which the operative positions of the recesses and the seals does not change. The "dead band" avoids continual pressure adjustments, generally restricting adjustment of the pressure in the sub-chamber 28 to those conditions where there is a significant change in the fluid pressure in the sub-chamber 26.

In the majority of applications the shaft 16 accurately follows the movement of the diaphragm by being biased against the diaphragm. However in addition to the biasing of the follower shaft 16 into contact with the diaphragm 20 it may be desirable in some circumstances to link the shaft 16 physically to the diaphragm so that it will follow the diaphragm movement irrespective of the biasing. In such circumstances it would be possible to dispense with the biasing of the shaft 16 against the diaphragm.

Figure 5:
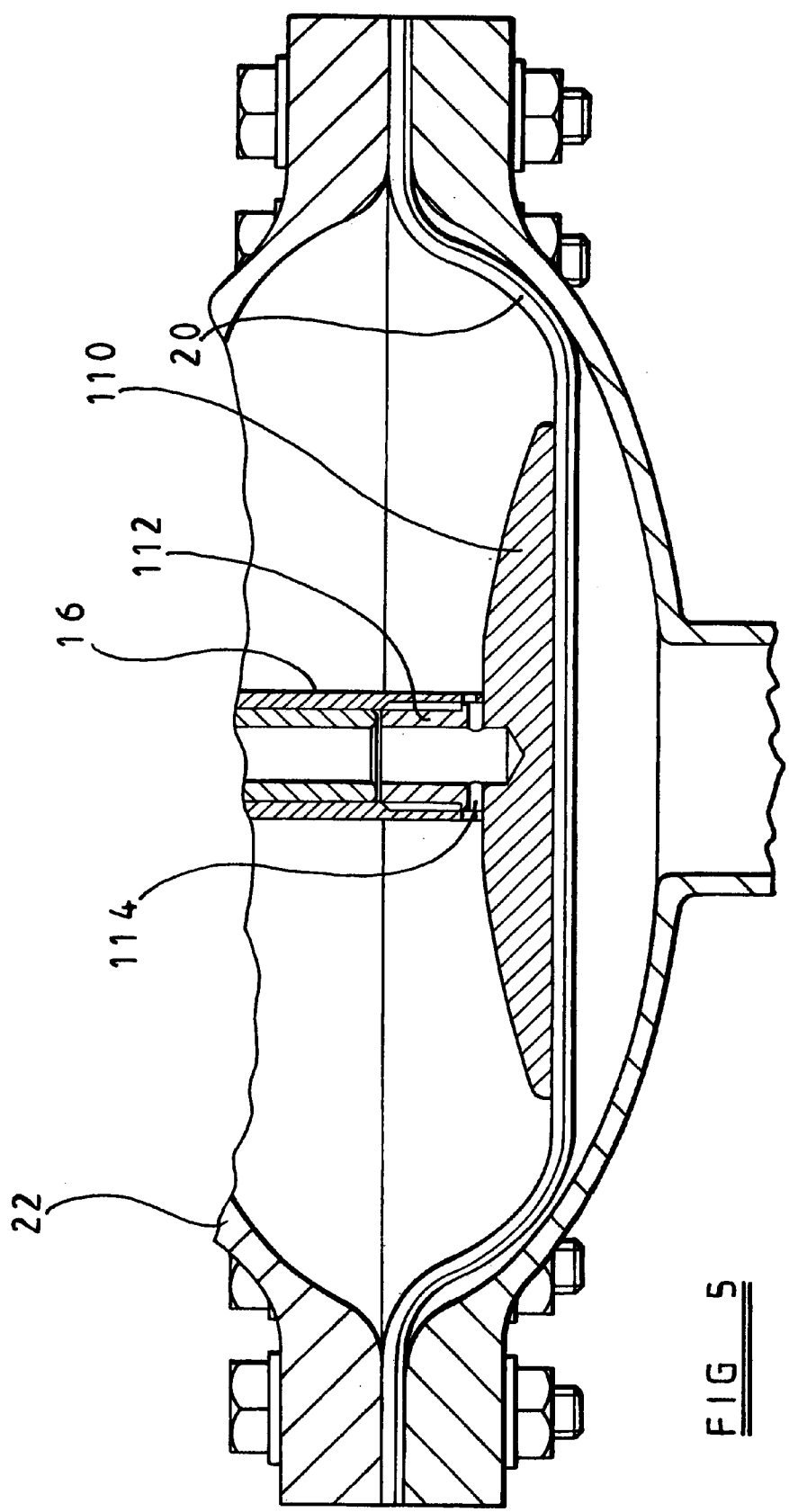
FIG. 5 is across sectional view illustrating a desirable modification.

FIG. 5 illustrates a modification which desirably will be incorporated in the embodiment disclosed in FIGS. 1 to 4. The shaft 16 engages the diaphragm 20 through the intermediary of a disc 110 the diameter of which is between the diameter of the diaphragm and that of the shaft. The disc thus increases the area of contact of the shaft with the diaphragm and in supports the diaphragm controlling the shape which the diaphragm assumes when subject to a pressure differential. The disc has a hollow, externally screw threaded spigot 112 received in threaded engagement in the end of the shaft 16 to secure the disc to the shaft, and there is a cross drilling 114 whereby the interior of the shaft 16 communicates with the sub-chamber 28. In FIG. 5 the shaft is shown as two concentric components, the inner component simply being a sleeve used to hold the seal 98 in place in the shaft 16. It will be understood that in those circumstances where connection of the shaft 16 to the diaphragm is preferred the disc 110 can still be provided and if desired a second similar disc can be provided at the opposite side of the diaphragm, linked to the disc 110 by a component extending through the diaphragm in sealing engagement therewith.

The arrangements described above will be used, inter alia, to eliminate pressure changes in the supply of liquid or fluid paint from a reciprocating supply pump to one or more paint spraying stations, the sub-chamber 26 communicating with the supply line from the pump. Pressure "spikes" to be eliminated by the above described suppressor can occur in the supply line as a result, for example, of the reciprocating pump changing stroke direction and one or more spray guns becoming inoperative.

What is claimed is:

1. A surge suppression apparatus including: a diaphragm, a chamber divided into first and second sub-chambers by the diaphragm, a diaphragm follower being movable in response to the movement of the diaphragm as a result of a pressure differential between the first and second sub-chambers, a first valve with a movable element, and a second valve with a movable element, the diaphragm follower being movable relative to a wall of the chamber and being the movable element of the first valve for determining the existence or otherwise of a communication pathway between the second sub-chamber and a gas inlet and being the movable element of the second valve for determining the existence or otherwise of a communication pathway between the second sub-chamber and a gas outlet, wherein said diaphragm follower is biased to contact the diaphragm at all times by a loading derived from gas pressure in the second sub-chamber.

2. A surge suppression apparatus as claimed in claim 1 wherein said second valve includes a bleed path which opens prior to full opening of the valve so as to effect a controlled release of pressure through said gas outlet.

3. A surge suppression apparatus as claimed in claim 1 wherein said wall of the chamber is part of a housing assembly which defines static parts of said first and second valves.

4. A surge suppression apparatus as claimed in claim 1 wherein said first and second valves are so arranged that there is a range of movement of the diaphragm on opposite side of a central equilibrium position in which neither valve is operated so as to define a "dead band" in the operation of the apparatus.

5. A surge suppression apparatus as claimed in claim 1 wherein said diaphragm follower includes a disc of larger diameter than the follower and smaller diameter than the diaphragm and engaging the diaphragm and controlling flexure thereof.

6. A surge suppression apparatus as claimed in claim 1 wherein said loading derived from gas pressure is effected by a larger effective cross-sectional area at a portion of the diaphragm follower remote from the diaphragm than an effective cross-sectional area at a portion of the diaphragm follower closer to the diaphragm.

7. A surge suppression apparatus as claimed in claim 6 wherein said larger effective cross-sectional area is at the end of the diaphragm follower remote from the diaphragm.

* * * * *